(12) United States Patent
Lin

(10) Patent No.: US 11,236,475 B2
(45) Date of Patent: Feb. 1, 2022

(54) WARNING STRUCTURE AND BRACKET

(71) Applicant: HONGFUJIN PRECISION ELECTRONICS(TIANJIN)CO., LTD., Tianjin (CN)

(72) Inventor: Ke-Cheng Lin, New Taipei (TW)

(73) Assignee: HONGFUJIN PRECISION ELECTRONICS(TIANJIN)CO., LTD., Tianjin (CN)

(*) Notice: Subject to any disclaimer, the term of this patent is extended or adjusted under 35 U.S.C. 154(b) by 15 days.

(21) Appl. No.: 16/824,887

(22) Filed: Mar. 20, 2020

(65) Prior Publication Data

US 2021/0262180 A1    Aug. 26, 2021

(30) Foreign Application Priority Data

Feb. 21, 2020  (CN) .......................... 202010107545.8

(51) Int. Cl.
| | |
|---|---|
| *E01F 9/646* | (2016.01) |
| *E01F 9/627* | (2016.01) |
| *E01F 9/608* | (2016.01) |
| *E01F 9/692* | (2016.01) |
| *E01F 9/65* | (2016.01) |

(52) U.S. Cl.
CPC ............ *E01F 9/629* (2016.02); *E01F 9/608* (2016.02); *E01F 9/646* (2016.02); *E01F 9/65* (2016.02); *E01F 9/692* (2016.02)

(58) Field of Classification Search
CPC ... E01F 9/60; E01F 9/608; E01F 9/623; E01F 9/629; E01F 9/646; E01F 9/65; E01F 9/688; E01F 9/692

USPC .................................................... 116/63 T
See application file for complete search history.

(56) References Cited

U.S. PATENT DOCUMENTS

| | | | |
|---|---|---|---|
| 5,335,924 A * | 8/1994 | Richards, Sr. | A63C 17/1436 188/5 |
| 8,164,483 B1 * | 4/2012 | Phillips | E01F 9/646 340/908 |
| 9,235,210 B2 * | 1/2016 | Zhang | B60Q 7/00 |
| 9,972,205 B2 * | 5/2018 | Beaulieu | H04W 4/023 |
| 10,850,663 B1 * | 12/2020 | Wang | G09F 13/16 |
| 2021/0174712 A1 * | 6/2021 | Chien | B60Q 7/005 |
| 2021/0261051 A1 * | 8/2021 | Wang | F16M 11/22 |

FOREIGN PATENT DOCUMENTS

| | | |
|---|---|---|
| CN | 107527568 A | 12/2017 |
| CN | 107696968 A | 2/2018 |
| DE | 102013104990 A1 | 11/2014 |

* cited by examiner

*Primary Examiner* — Gary S Hartmann
(74) *Attorney, Agent, or Firm* — ScienBiziP, P.C.

(57) ABSTRACT

A warning structure includes a bracket and a warning member mounted on the bracket. The bracket includes a main body, rollers rotationally mounted to the main body, and a stopping assembly including a rotating mechanism and a stopping member coupled to the rotating mechanism. The rotating mechanism is rotationally coupled to the main body. One of the rollers is mounted adjacent to the stopping member. When the rotating mechanism is rotated, the stopping member is engaged with a ground to prevent the bracket from moving.

12 Claims, 3 Drawing Sheets

WARNING STRUCTURE AND BRACKET

FIELD

The subject matter herein generally relates to warning structures, and more particularly to a warning structure for use on the road.

BACKGROUND

Many warning structures come equipped with rollers. Generally, a warning structure, such as a warning triangle, needs to be placed on the ground during an emergency stop. However, a wind may cause the warning structure to move out of position.

BRIEF DESCRIPTION OF THE DRAWINGS

Implementations of the present disclosure will now be described, by way of embodiments, with reference to the attached figures.

DETAILED DESCRIPTION

Figure 1:
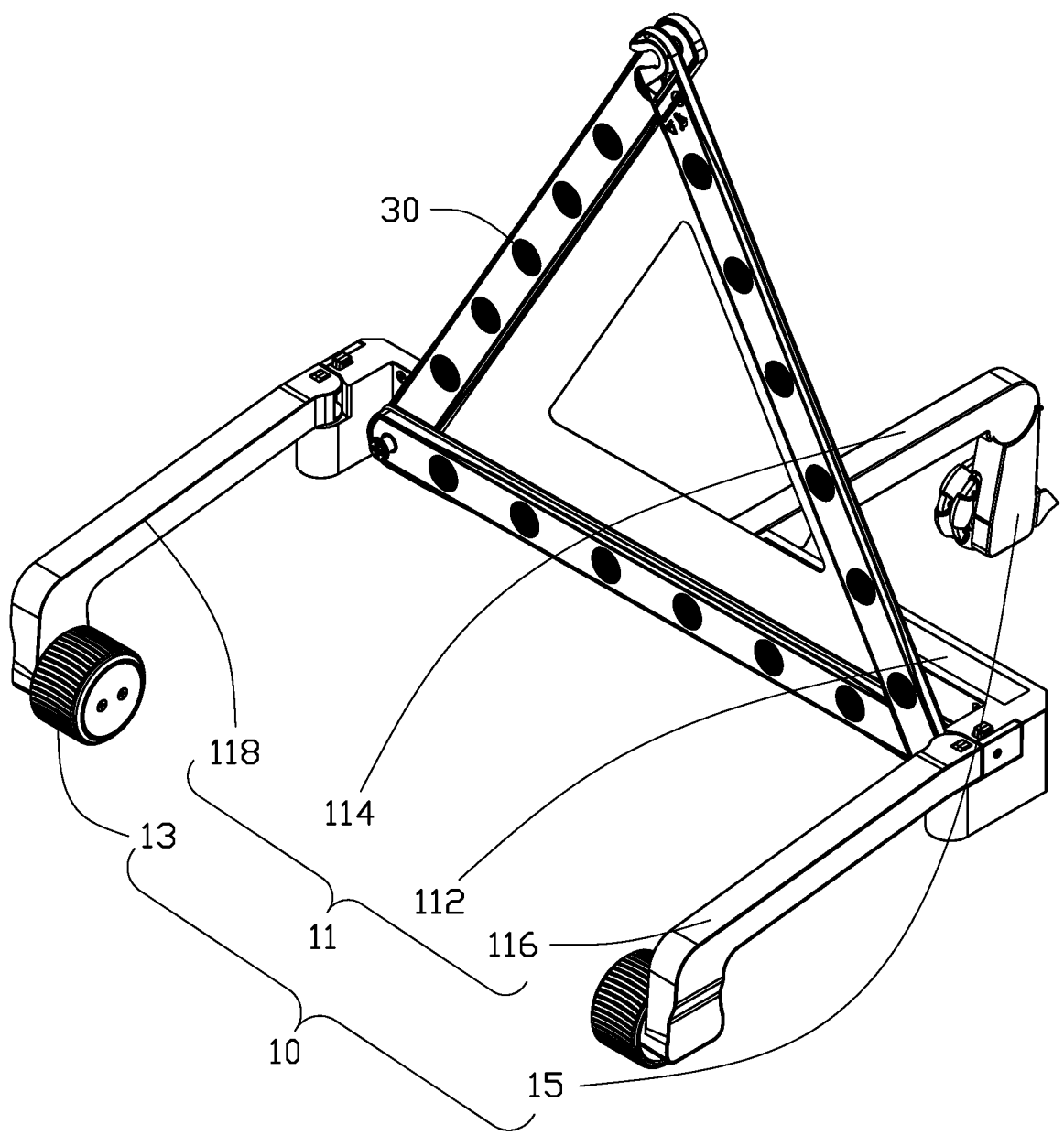
FIG. 1 is an assembled, isometric view of an embodiment of a warning structure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of a warning structure 100 including a bracket 10 and a warning member 30 provided on the bracket 10.

The bracket 10 includes a main body 11, a plurality of rollers 13, and at least one stopping assembly 15. The main body 11 is connected to the warning member 30. The at least one stopping assembly 15 is connected to the main body 11 and configured to prevent the bracket 10 from being moved by an external force, such as wind.

Figure 2:
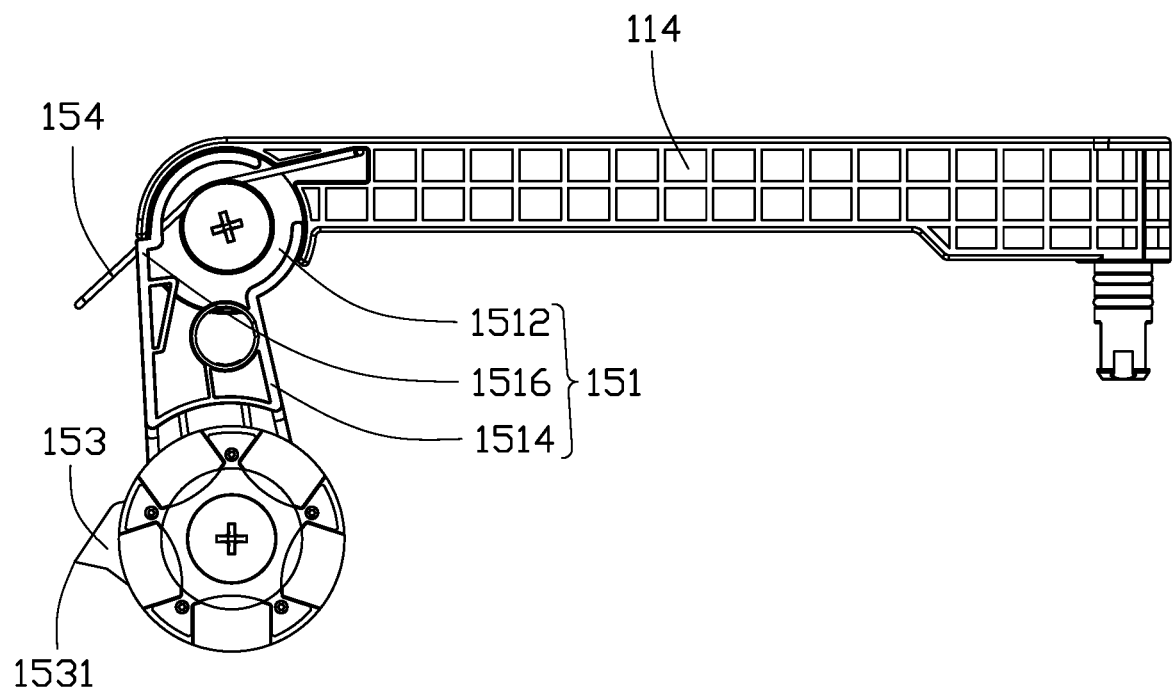
FIG. 2 is a side view of a stopping assembly of the warning structure.
Figure 3:
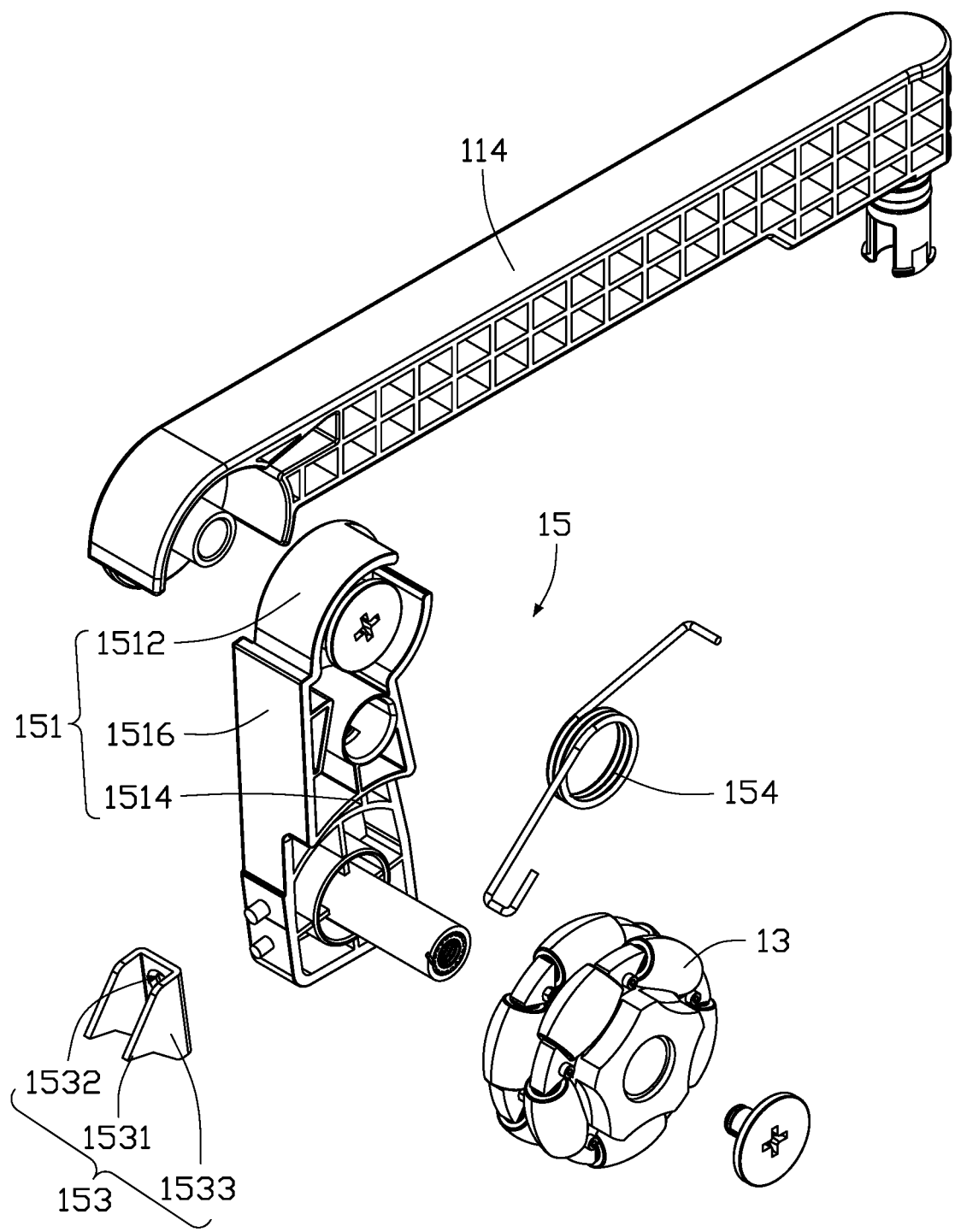
FIG. 3 is an exploded, isometric view of the stopping assembly.

Referring to FIGS. 2 and 3, the stopping assembly 15 includes a rotating mechanism 151 and a stopping member 153. The rotating mechanism 151 is rotationally connected to the main body 11. Two of the rollers 13 are mounted on the main body 11, and one of the rollers 13 is mounted on a distal end of the rotating mechanism 151. The stopping member 153 is disposed on the rotating mechanism 151 and is adjacent to the one of the rollers 13. When the rotating mechanism 151 is rotated, the stopping member 153 is caused to resist on a ground to stop the bracket 10 from moving.

The main body 11 includes a connecting member 112, a first extending member 114, a second extending member 116, and a third extending member 118. The connecting member 112 is connected to the warning member 30. The first extending member 114, the second extending member 116, and the third extending member 118 are connected to the connecting member 112. The first extending member 114 is connected to a substantially middle portion of the connecting member 112. The second extending member 116 and the third extending member 118 are respectively connected to two ends of the connecting member 112. The second extending member 116 and the third extending member 118 extend on one side of the connecting member 112, and the first extending member 114 extends on another side of the connecting member 112.

An end of the second extending member 116 and an end of the third extending member 118 are connected to a corresponding roller 13. An end of the first extending member 114 is connected to the stopping assembly 15.

It can be understood that in other embodiments, the second extending member 116 and the third extending member 118 may each be connected to a corresponding stopping assembly 15.

In one embodiment, the stopping member 153 includes a mounting portion 1532 and two side portions 1533. The two side portions 1533 are respectively connected to two side edges of the mounting portion 1532. The mounting portion 1532 is mounted on the rotating mechanism 151, and each of the two side portions 1533 forms a tip 1531 pointing away from the mounting portion 1532. The tips 1531 are located on a side of the stopping member 153 facing away from the rotating mechanism 151. The tips 1531 are configured to engage with the ground to prevent the warning structure 100 from moving.

It can be understood that in other embodiments, the tips 1531 may be omitted, such that the stopping member 153 directly engages with the ground to prevent the warning structure 100 from moving.

The rotating mechanism 151 includes a rotating portion 1512 and a leg portion 1514. The rotating portion 1512 is rotationally mounted to the first extending member 114. The leg portion 1514 is connected to the corresponding roller 13 and the stopping member 153.

In one embodiment, a protruding portion 1516 is provided on a side of the rotating mechanism 151 facing away from the connecting member 112 and located between the stopping member 153 and the rotating portion 1512. The protruding portion 1516 abuts against the first extending member 114, thereby tilting the rotating mechanism 151 relative to the ground and preventing the rotating mechanism 151 from rotating away from the connecting member 112.

The stopping assembly 15 further includes a resilient member 154. The resilient member 154 connects the rotating mechanism 151 to the first extending member 114. The resilient member 154 is configured to bias the protruding portion 1516 to contact the first extending member 114. In one embodiment, the resilient member 154 is a torsion spring.

In one embodiment, the warning member 30 is a triangle. It can be understood that in other embodiments, the warning member 30 may be other shapes.

In use, after the warning structure 100 is set in position, when an external force such as a wind blows, the external force may tilt the warning member 30, and a portion of the external force is converted into a downward force. Under the action of the downward force, the rotating mechanism 151 is rotated toward the connecting member 112, and the tips 1531 are engaged with the ground, so that the warning structure 100 is prevented from moving. When the external force vanishes, the resilient member 154 drives the rotating mechanism 151 to restore a position of the rotating mechanism 151.

It can be understood that in other embodiments, the number of the stopping assemblies 15 may be increased as required and the stopping assemblies 15 may be disposed on other parts such as the second extending member 116 and the third extending member 118.

As described above, the stopping member 153 of the bracket 10 prevents the warning structure 100 from being moved by an external force, thereby improving a stability of the warning structure 100.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A bracket comprising:
   a main body;
   a plurality of rollers rotationally mounted to the main body; and
   a stopping assembly comprising a rotating mechanism and a stopping member coupled to the rotating mechanism; wherein:
   the rotating mechanism is rotationally coupled to the main body;
   one of the plurality of rollers is mounted adjacent to the stopping member; and
   when the rotating mechanism is rotated, the stopping member is engaged with a ground to prevent the bracket from moving;
   wherein the main body comprises a connecting member, a first extending member, a second extending member, and a third extending member;
   the first extending member is coupled to a middle portion of the connecting member;
   the second extending member and the third extending member are respectively coupled to two ends of the connecting member; and
   the rotating mechanism is rotationally coupled to the first extending member.

2. The bracket of claim 1, wherein:
   the stopping member comprises at least one tip for engaging with the ground.

3. The bracket of claim 1, wherein:
   the stopping member comprises a mounting portion and two side portions;
   the two side portions are respectively coupled to two side edges of the mounting portion;
   the mounting portion is mounted on the rotating mechanism; and
   each of the two side portions forms a tip pointing away from the mounting portion.

4. The bracket of claim 1, wherein:
   the rotating mechanism comprises a rotating portion and a leg portion;
   the rotating portion is rotationally mounted to the main body; and
   the leg portion is coupled to a corresponding one of the plurality of rollers and the stopping member.

5. The bracket of claim 4, wherein:
   the rotating mechanism comprises a protruding portion on a side of the rotating mechanism facing away from the connecting member and located between the stopping member and the rotating portion; and
   the protruding portion abuts against the main body, thereby tilting the rotating mechanism relative to the ground.

6. The bracket of claim 5, wherein:
   the stopping assembly further comprises a resilient member;
   the resilient member connects the rotating mechanism to the first extending member; and
   the resilient member is configured to bias the protruding portion to contact the first extending member.

7. A warning structure comprising a bracket and a warning member mounted on the bracket, the bracket comprising:
   a main body;
   a plurality of rollers rotationally mounted to the main body; and
   a stopping assembly comprising a rotating mechanism and a stopping member coupled to the rotating mechanism; wherein:
   the rotating mechanism is rotationally coupled to the main body;
   one of the plurality of rollers is mounted adjacent to the stopping member; and
   when the rotating mechanism is rotated, the stopping member is engaged with a ground to prevent the bracket from moving;
   wherein the main body comprises a connecting member, a first extending member, a second extending member, and a third extending member;
   the first extending member is coupled to a middle portion of the connecting member;
   the second extending member and the third extending member are respectively coupled to two ends of the connecting member; and
   the rotating mechanism is rotationally coupled to the first extending member.

8. The warning structure of claim 7, wherein:
   the stopping member comprises at least one tip for engaging with the ground.

9. The warning structure of claim 7, wherein:
   the stopping member comprises a mounting portion and two side portions;
   the two side portions are respectively coupled to two side edges of the mounting portion;

the mounting portion is mounted on the rotating mechanism; and each of the two side portions forms a tip pointing away from the mounting portion.

10. The warning structure of claim 7, wherein:

the rotating mechanism comprises a rotating portion and a leg portion;

the rotating portion is rotationally mounted to the main body; and the leg portion is coupled to a corresponding one of the plurality of rollers and the stopping member.

11. The warning structure of claim 10, wherein:

the rotating mechanism comprises a protruding portion on a side of the rotating mechanism facing away from the connecting member and located between the stopping member and the rotating portion; and the protruding portion abuts against the main body, thereby tilting the rotating mechanism relative to the ground.

12. The warning structure of claim 11, wherein:

the stopping assembly further comprises a resilient member;

the resilient member connects the rotating mechanism to the first extending member; and the resilient member is configured to bias the protruding portion to contact the first extending member.

\* \* \* \* \*